United States Patent Office 2,919,941
Patented Jan. 5, 1960

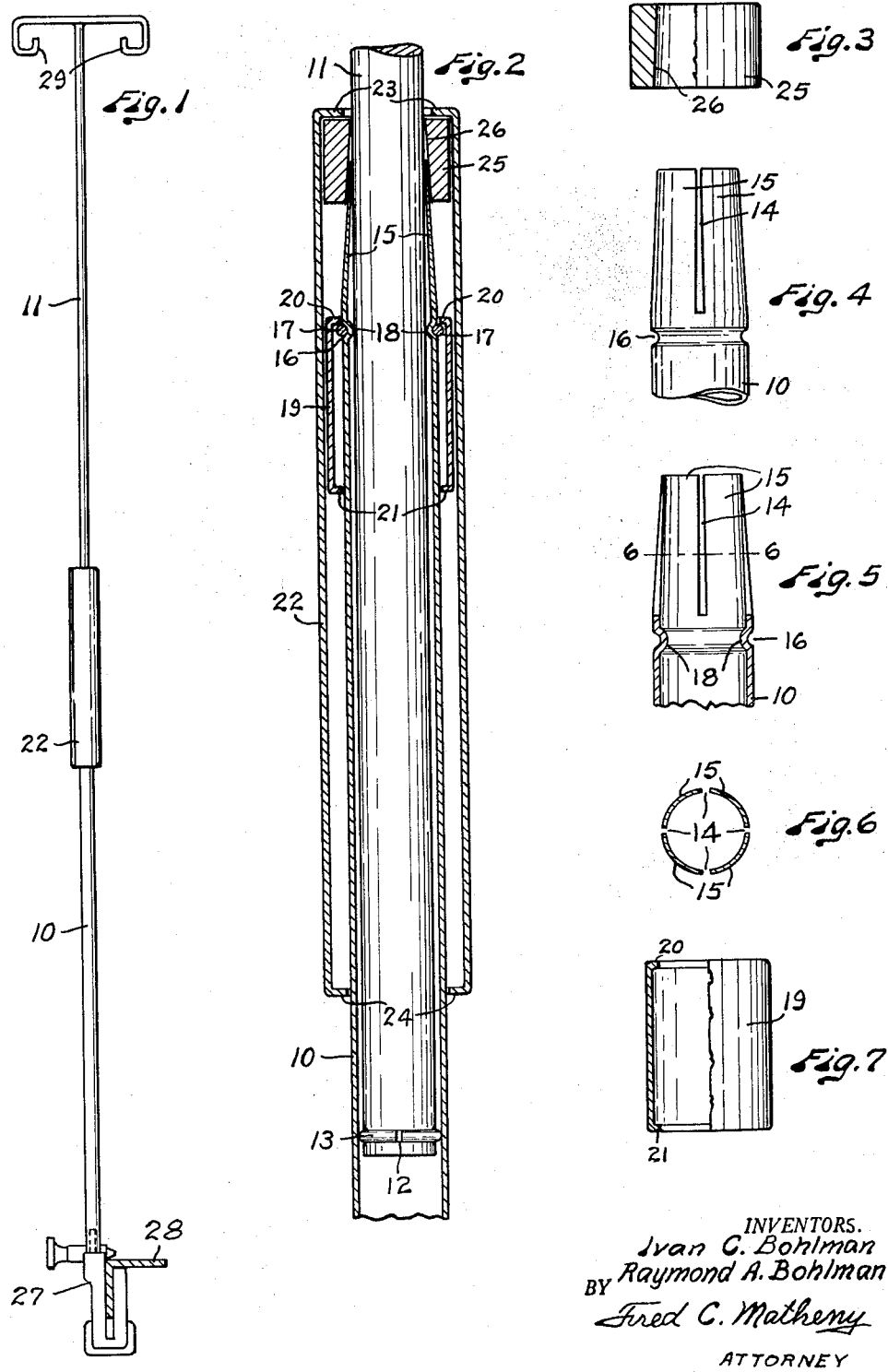

2,919,941

TELESCOPIC MEMBERS AND LOCK MEANS THEREFOR

Ivan C. Bohlman and Raymond A. Bohlman, Walla Walla, Wash.

Application November 4, 1957, Serial No. 694,313

3 Claims. (Cl. 287—58)

This invention relates to telescopic members and lock means therefor and an object of this invention is to provide highly efficient and quickly and easily operable means for securely but releasably locking together two relatively telescopic members.

Another object is to provide an extensible support having telescopic members and having locking devices of simple construction composed of few parts which are strong and durable and not expensive to manufacture, which are dependable and will positively hold the telescopic members in any locked position relative to each other and which will not stick or bind and can be quickly and easily released from a locked position.

Another object is to provide an extensible telescopic support which is well adapted for use in hospitals and sick rooms as a bed attachment for supporting flasks and similar receptacles in an elevated position above a bed.

Another object is to provide an extensible telescopic support comprising an extension member, a tube slidably receiving said extension member, said tube having a slotted tapered end portion capable of being locked onto the extension member, a clamping ring movable over the slotted tapered end portion of the tube to lock or release the tube relative to the extension member, and an impact member movable longitudinally of the tube and extension member to selectively apply blows in different directions to the clamping ring in tightening or loosening said ring relative to the slotted tapered end portion of the tube.

Other objects of this invention will be apparent from the following description taken in connection with the accompanying drawings.

Figure 1 is a view in elevation of an extensible telescopic support constructed in accordance with this invention showing the same extended and mounted in an upright position on a side rail of a bed.

Fig. 2 is a longitudinal sectional view, with parts in elevation and on a larger scale than Fig. 1, showing the releasable means for locking together two relatively telescopic parts of this device.

Fig. 3 is a detached view, partly in section and partly in elevation, of an internally tapered tubular clamping collar embodied in this invention.

Fig. 4 is a fragmentary detached elevation showing the slotted and tapered end portion of a tube embodied in this invention.

Fig. 5 is a fragmentary vertical sectional view of the tube part shown in Fig. 4.

Fig. 6 is a cross sectional view taken substantially on broken line 6—6 of Fig. 5.

Fig. 7 is a detached view partly in section and partly in elevation of a cylindrical sleeve embodied in this invention.

Like reference numerals refer to like parts throughout the drawings.

This invention comprises a metal tube 10 having an extension member 11 of smaller diameter than the tube telescopically disposed therein. The extension member 11 is herein referred to as a rod but it will be understood that said member 11 may be tubular if desired. Also the several parts of this device are herein shown cylindrical but it will be understood that their cross sectional shape can be varied, for instance, they may be square or hexagonal, in which instance the several parts will be non-rotatable relative to each other. The lower end portion of the rod 10 has an annular groove 12 wherein is disposed a resilient split ring 13. The ring 13 can bear against the inner wall of the tube 10 and said ring functions as a stop member, as hereinafter described. Obviously this support can be put to many different uses and can be used in many different positions but for purposes of this description it is regarded as an upright support and the terms upper and lower refer to the positions in which the parts are shown in the drawings.

A plurality of slots 14 extend from the upper end of the tube 10 downwardly for a substantial distance and divide the upper end portion of said tube 10 into a plurality of resilient segments 15 which can be tightened against the rod 11 into clamping engagement with said rod. The metal forming the segments 15 is of convergently tapered thickness so that the outer or upper end portions of these segments are relatively thin. Preferably this taper is provided by removing metal from the exterior of the tube 10. Also these segments are permanently bent inwardly slightly toward the axis of the tube so that the relatively thin end portions of said segments can lie close to or contact and rub against the rod 11.

The tube 10 is also provided, a short distance below the lowermost ends of the slots 14, with an external annular ring groove 16 within which is a resilient split ring 17. The annular groove 16 is formed by inwardly displacing the metal of the tube so as to provide both the external annular groove and an inwardly protruding annular bead ring 18. The bead ring 18 serves as a guide and bearing for the rod 11 and as a stop with which the split ring 13 may engage to prevent complete detachment of the rod 11 from the tube 10.

A short tubular metal clamp releasing sleeve 19, of an internal diameter slightly larger than the external diameter of the split ring 17, fits over the tube 10 and ring 17 and is longitudinally movable a limited distance along the tube 10. The sleeve 19 has two inwardly bent internal end flanges 20 and 21 which are capable of engaging with the split ring 17 and by which movement of the sleeve 19 along the tube 10 is limited. An impact member or hammer tube 22 of an internal diameter slightly larger than the external diameter of the sleeve 19 fits over the tube 10 and sleeve 19 and rod 11 and is longitudinally movable relative to these parts. The impact member 22 has two internally directed end flanges 23 and 24 at its respective ends by which blows can be delivered, as hereinafter explained, on an internally tapered tubular clamping collar or ring 25.

The clamping collar 25 has an annular inner wall 26 which is slightly convergently inclined from its lowermost to its uppermost end, as shown in Figs. 2 and 3. Said collar 25 is disposed on the rod 11 within the impact tube 22 adjacent the split or clamping end portion of the tube 10. The larger end of the convergent annular passageway of the collar 25 faces and is adapted to fit over the segments 15 which form the contractable end of the tube 10. When the clamping ring 25 is driven over the segments 15 it will clamp said segments firmly onto the rod 11 and securely lock the tube 10 and rod 11 together.

When this device is to be used as a bed attachment, as shown in Fig. 1, the lower end of the tube 10 is rigidly attached to a clamp 27 which can be clamped onto a bed rail 28. Such a clamp is fully disclosed in our copending patent application Serial Number 605,673. Also, for this use, the upper end of the cylindrical member 11 is preferably provided with suitable hooks 29 from which flasks and like receptacles can be suspended.

In the use of this device as an adjustable upright support from which a receptacle of any desired form can be suspended, the device is attached in a vertical position to the bed rail 28 or a similar support. With the clamp collar 25 loose on the segments 15 the rod 11 is adjusted so as to position the hooks 29 at a desired elevation. Then, while holding the rod 11 at the chosen elevation, the impact member 22 is lifted and the collar 25 driven onto the segments 15 by striking one or more downward blows with the shoulders 23 on the upper end of the collar 25. This effectively locks the rod 11 and tube 10 against relative longitudinal movement. The taper of the internal wall 26 of the clamp collar 25 is slight and the collar 25 will not tend to loosen on the segments 15. Also the weight of the impact tube 22 will normally rest on the collar 25 and tend to prevent loosening of said collar. To vertically adjust the rod 11 or to telescope it into the tube 10 the collar 25 is released from the segments 15 by grasping the impact tube 22 and imparting to it at least one sharp upward movement so that the shoulders 24 of impact tube 22 contact the lowermost shoulders 21 of sleeve 19 and drive the uppermost shoulders 20 of said sleeve 19 against the lowermost end of the clamp collar 25. Preferably the initial inward incline of the segments 15 holds the ends of said segments against the rod 11 with enough force to prevent dropping of the rod 11 when the collar 25 is released by driving it upwardly. At the same time this frictional pressure does not interfere with easy movement of the rod lengthwise of the tube 10. If desired the ring 13 on the lowermost end of the rod 11 can be made to exert some outward frictional pressure against the tube 10 to help prevent the rod 11 from moving too freely within the tube 10 when the collar 25 is in a released position. If the rod 11 and tube 10 are of about the same length then the minimum telescoped length of the support can be only a little more than half of its maximum extended length.

The foregoing description and accompanying drawings clearly disclose a preferred embodiment of this invention but it will be understood that this disclosure is merely illustrative and that changes may be made within the scope of the following claims.

We claim:

1. In telescopic devices, an extension member; a tube slidably receiving said extension member, said tube having longitudinal slots extending inwardly from one end thereof forming between said slots resilient clamping segments, the wall thickness of said segments tapering convergently toward the outer ends of the segments and the segments being inclined radially inward and having their outer thin ends positioned in close relation to said extension member; a clamp releasing sleeve slidable on said tube; an internally tapered clamping collar movable along said extension member into and out of clamping engagement with said segments in selectively clamping and releasing said segments relative to said extension member; an impact member fitting over said extension member and said tube and said sleeve and said clamping collar, said impact member having two spaced apart shoulders respectively positioned to contact said clamping collar and drive said collar over said segments when the impact member is moved in one direction and to contact said clamp releasing sleeve and drive said collar off said segments when the impact member is moved in the opposite direction.

2. In telescopic devices, an extension member; a support tube slidably receiving said extension member, said support tube having longitudinal slots extending inwardly from one end thereof forming between said slots resilient clamping segments, the wall thickness of said segments tapering convergently toward the outer ends of the segments and the segments being inclined radially inward and having their thinner outer ends positioned in close relation to said extension member; an internally tapered clamping collar movable toward and away from said segments in selectively clamping said segments onto and releasing said segments from said extension member; a stop member extending outwardly from the external wall of said support tube adjacent the inner ends of said slots; a clamp releasing sleeve of substantial length movable on said support tube and fitting over said stop member; two inwardly directed spaced apart shoulders rigid with said sleeve and positioned to engage with said stop member, whereby movement of said sleeve relative to said support tube is limited, said sleeve being of a length approximately equal to the length of said segments, whereby an end of said sleeve can be driven against said clamping collar when said collar is engaged over said segments; and an impact tube slidably fitting over said extension member and said support tube and said sleeve and said collar, said impact tube having two inwardly directed spaced apart shoulders respectively positioned to contact said collar and said sleeve in tightening and loosening said collar relative to said segments.

3. In telescoping devices, an extension member; a support tube slidably receiving said extension member, said support tube having slots extending from one end thereof inwardly and forming between said slots resilient clamping segments which are radially inclined inward and have their outer ends positioned in close relation to said extension member; an internally tapered clamping collar movable over said segments in selectively clamping and releasing said extension member; an annular inwardly displaced ring groove member in the wall of said support tube adjacent the slotted end thereof providing a ring groove externally of said support tube and an annular stop shoulder internally thereof; a stop ring in said ring groove; a clamp releasing sleeve movable over said stop ring and having spaced apart stop shoulders positioned to contact said stop ring in limiting longitudinal movement of said sleeve, said sleeve contacting said clamping collar when the collar is clamped onto the segments and the sleeve is driven toward the collar; an externally positioned longitudinally movable impact tube having its two ends bent inwardly forming shoulders capable respectively of striking said clamping collar and said sleeve in tightening and loosening said collar relative to said segments; and an outwardly protruding stop ring on an end portion of said cylindrical member positioned to contact the inwardly protruding part of said ring groove member in limiting extension movement of said extension member relative to said support tube.

References Cited in the file of this patent

UNITED STATES PATENTS

| 445,440 | Davis et al. | Jan. 28, 1891 |
| 2,455,525 | Schulz | Dec. 7, 1948 |
| 2,791,926 | Guyton | May 14, 1957 |
| 2,825,410 | Brown | Mar. 4, 1958 |

FOREIGN PATENTS

| 470,745 | Germany | Jan. 30, 1929 |